United States Patent
Daios

(10) Patent No.: US 10,624,274 B2
(45) Date of Patent: Apr. 21, 2020

(54) MULTILAYER PLASTIC FILM FOR PERRENIAL AGRICULTURAL USE WITH SELF-ADJUSTING SHADING ATTRIBUTE

(71) Applicant: Asterios Daios, Naoussa (GR)

(72) Inventor: Asterios Daios, Naoussa (GR)

( * ) Notice: Subject to any disclaimer, the term of this patent is extended or adjusted under 35 U.S.C. 154(b) by 228 days.

(21) Appl. No.: 15/571,652

(22) PCT Filed: May 5, 2016

(86) PCT No.: PCT/GR2016/000019
§ 371 (c)(1),
(2) Date: Nov. 3, 2017

(87) PCT Pub. No.: WO2016/178036
PCT Pub. Date: Nov. 10, 2016

(65) Prior Publication Data
US 2018/0303042 A1    Oct. 25, 2018

(30) Foreign Application Priority Data

May 6, 2015 (GR) .............................. 20150100198

(51) Int. Cl.
*A01G 9/14* (2006.01)
*A01G 9/22* (2006.01)
(Continued)

(52) U.S. Cl.
CPC .............. *A01G 9/1438* (2013.01); *A01G 9/22* (2013.01); *A01G 13/02* (2013.01); *C08J 5/18* (2013.01); *B32B 27/32* (2013.01); *Y02A 40/252* (2018.01)

(58) Field of Classification Search
CPC .......... A01G 9/1438; A01G 2009/1453; A01G 13/02; A01G 9/22; A47G 7/08; A47G 7/085; C08J 5/18
See application file for complete search history.

(56) References Cited

U.S. PATENT DOCUMENTS

| | | | |
|---|---|---|---|
| 4,683,922 A | 8/1987 | Harrison et al. | |
| 5,492,741 A * | 2/1996 | Akao | B32B 5/18 428/35.2 |

(Continued)

FOREIGN PATENT DOCUMENTS

| | | |
|---|---|---|
| CN | 103660485 A | 3/2014 |
| CN | 203608629 U | 5/2014 |

(Continued)

*Primary Examiner* — Monica L Williams
(74) *Attorney, Agent, or Firm* — David S. Safran; Roberts Calderon Safran & Cole, P.C.

(57) ABSTRACT

A multilayer plastic film for perennial agricultural use (1) either in greenhouses or under low tunnels (2) that, self-adjusts the shading provided in the covered space (4). The shading effect can be present in the whole surface of the film, or it could be partial at specific surfaces (3) where shading would be most needed. The shading is achieved by incorporating a photochromic compound or a combination of photochromic compounds in a layer of multiple layers in a multilayer film (1). The layer or layers that incorporate the photochromic compound or compounds are protected from oxidation by bilateral layers that incorporate materials that exhibit low permeability to gases and in particular to oxygen. The advantage of the film is that the grower would not need to apply any shading material on the surface of the film and/or any mechanism to facilitate opening and closing of the shading material.

28 Claims, 6 Drawing Sheets

(51) Int. Cl.
  *A01G 13/02* (2006.01)
  *C08J 5/18* (2006.01)
  *B32B 27/32* (2006.01)

(56) References Cited

U.S. PATENT DOCUMENTS 9,733,132 B2    8/2017   Hwang
2014/0230717 A1*   8/2014   Hwang .............. B41M 5/38271
                                                              116/216

FOREIGN PATENT DOCUMENTS

| | | |
|---|---|---|
| DE | 10 2006 023 965 A1 | 11/2007 |
| GR | 58727 B | 11/1977 |
| GR | 1004441 B | 2/2004 |
| GR | 20020100249 A | 2/2004 |
| JP | 2001-75891 A | 3/2001 |
| WO | 2007/113480 A1 | 10/2007 |

\* cited by examiner

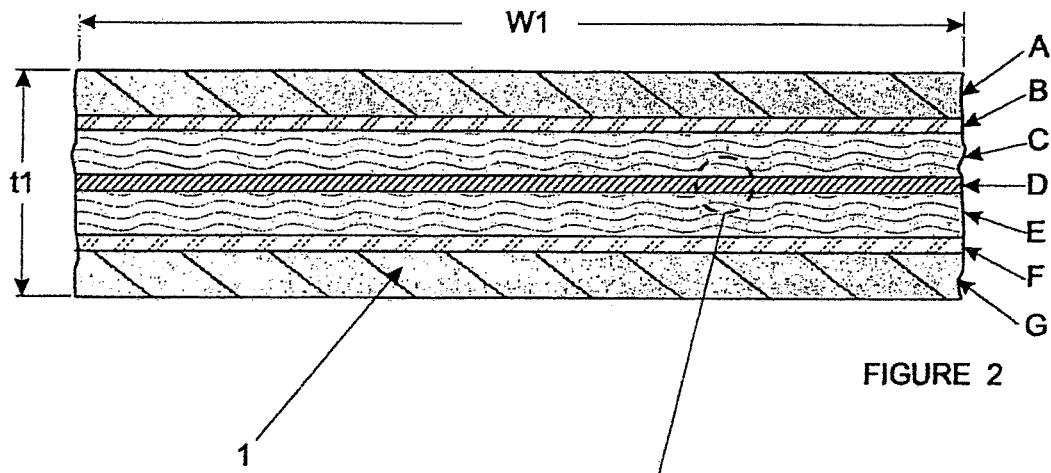
FIGURE 2
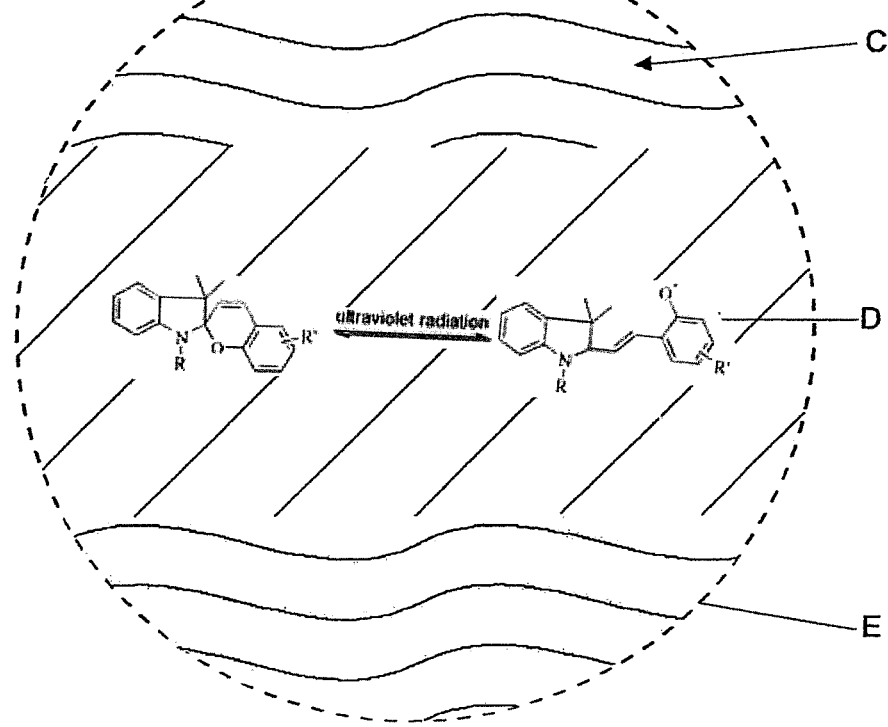

MULTILAYER PLASTIC FILM FOR PERRENIAL AGRICULTURAL USE WITH SELF-ADJUSTING SHADING ATTRIBUTE

BACKGROUND OF THE INVENTION

Field of the Invention

The invention refers to a multilayer plastic film for perennial agricultural use either in greenhouses or under low tunnels that, self-adjusts the shading provided in the covered space. The shading effect can be present in the whole surface of the film, or it could be partial at specific surfaces where shading would be most needed.

The advantage of the film is that the grower would not need to apply any shading material on the surface of the film and/or any mechanism to facilitate opening and closing of the shading material.

Description of Related Art

Sunlight although extremely beneficial to the crop, can cause damage, especially during the summer months and even more pronounced in greenhouses or low tunnels in which the crop is cultivated.

Direct and intense sunlight can cause:
a) Skin burns of the plants.
b) Increase temperature to such levels that the stomata of the leaves close thus decelerating or even stopping photosynthesis thus the overall growth of the plant.
c) Dehydration due to high temperatures, leading to plant stress thus drastic reduction of the yield.

Hence, there is a need of paramount importance to shade the covered space especially during the months when sunlight becomes very intense.

The plastic films, which are used in greenhouses and in ground covering or in any cultivation under low tunnels, are nowadays shaded in two distinct ways:
  a) Whitewash is applied in spring in order to reduce the light transmission of the film and simultaneously reflect part of the radiation. This has proven to be an inexpensive way to shade a greenhouse or tunnel, however it has the drawback that once the whitewash is applied it can only be removed by spraying cleaning agents that remove whitewash from the surface of the film. Thus, light transmission is capped by the application of whitewash, irrespective of the ambient light conditions. The present invention addresses this problem by adjusting itself to the ambient light conditions.
  There are systems that can be installed in the greenhouse itself, operating as energy screens, namely reducing light transmission. These systems can be mechanically opened and closed thus allowing for the adjustment of the amount of light in the greenhouse or tunnel. However, they prove to be expensive and require careful monitoring of the ambient light conditions as well as refined judgment of the decision maker on whether to close or open the screen. Several patents have been addressing the aforementioned issues in the past. U.S. Pat. No. 4,683,922 has provided a further solution with motorized curtains that shade the walls of the greenhouse thus employing a mechanical solution that requires a rather high initial investment.

UK Patent GR 58727 (A1) has tried to find a solution to the permanent shading that whitewash results to, by employing materials sprayed on the surface of the film that are hygroscopic and change their light permeability, however such a solution depends more on the levels of moisture than the light intensity and are not an inherent property of the film itself hence it has to be applied several time over the lifespan of the greenhouse film. Chinese Utility Model CN 203608629 (U) suggested a solution that employs an electrochromic glass and a microprocessor so that shading is adjusted, however it can only be employed in glasshouses thus not in all cultivations.

Chinese Utility Model CN 103660485 (U) proposes the use of several films at a distance between them of approximately 15 cm, one of which is electrochromic using a photochromic compound. This solution renders the installation expensive while the use of the photochromic effect is not perennial as the photochromic compound is not protected hence it is oxidized with time and the photochromic compound is not functional in the long term.

Several other solutions employ the use of nets to provide shading, applied above the greenhouse or low tunnel film. However, they are rather expensive both as an initial investment as well as applying and removing them.

The existing solutions although they prove to provide enough shading for the plant to grow under the required conditions they prove to lack any mechanism to adjust themselves to the ambient light conditions. The only feasible method of adjusting light conditions would be to open and close the shading net or screen, or remove and apply the whitewash.

A different approach has been taken with Japanese Patent Application JP 2001075891 and more precisely with the use of photochromic compounds to achieve shading in the covered space. This is however achieved by simply adding a photochromic compound in the matrix of a thermoplastic. The reason for which such plastic films for agricultural uses are not yet commercially and widely available is that while conventional plastic films with the state of the art are used perennially (commonly three to four years) a solution that provides shading with a photochromic reaction can only be used for less than a year. The reason that this happens is that oxidation of the photochromic compound takes place due to the gas permeability and in particular oxygen permeability of the thermoplastic matrix. Oxidation renders gradually the photochromic compound as inactive thus shading of the covered space cannot be provided for the desired lifespan Such technologies for plastic films have been developed in the past mainly for food packaging, allowing the films to exhibit barrier properties against gases such as oxygen employing materials such as EVOH, PA, PVDC among others. The reason that these materials are employs is that while common thermoplastics such as LDPE exhibit oxygen permeability of $2\times10^5$ $cm^3 \cdot \mu m$ $m^{-2}$ $d^{-1}$ $Pa^{-1}$ at 25° C., PVDC has a permeability of 8-200 $cm^3 \cdot \mu m$ $m^2$ $d^{-1}$ $Pa^{-1}$ at the same temperature conditions while EVOH has a permeability in the range of 5-80 $cm^3 \cdot \mu m$ $m^{-2}$ $d^{-1}$ $Pa^{-1}$.

It is therefore apparent that the use of barrier materials could protect a thermoplastic layer that is encapsulated y two barrier layers.

SUMMARY OF THE INVENTION

The above-mentioned problems and limitations are addressed by the present invention employing a plastic film that self-adjusts shading either on its total surface or partially at sections where shading is most needed.

It is however more than apparent that having a method of self-adjusting shading under greenhouses and low tunnels would optimize crop quality and yield, as there would be a self-regulation of the sun energy that is transmitted through the film. This leads to a decrease in temperature in the tunnel and diffusion of the sunlight.

To achieve this attribute a photochromic compound is added in the matrix that comprises said plastic film. Several photochromic compounds have been developed and evolved over the last decades such as:
a) Azo-compounds
b) Dihydro-indolizines
c) Diarylethanes
d) Chromenes
e) Napthopyrans
f) Spiropyrans
g) Fulgides
h) Fulgimides
i) Spirooxazines
j) Anthracenes Further materials would include Biological systems that show photochromic behavior.

All above mentioned compounds have been developed initially for ophthalmic lenses providing lenses that darken when exposed to sunlight thus functioning both as ophthalmic lenses and sunglasses at the same time, adjusting themselves to the ambient light conditions. Nowadays such compounds are employed in a variety of applications such as lenses, light filters, information storage, cosmetics, authentication, and fluid flow visualization among others.

A multitude of applications exists nowadays and even more numerous patents exist on products or compounds. However, their attributes have not been adopted and employed for the agricultural sector and in particular in the greenhouse and low tunnel sector. The reason why such a mass use of such solutions has not been applied yet is that photochromic compounds are particularly susceptible to oxidation when exposed to atmospheric oxygen.

The present invention solves these problems by employing a photochromic compound into its matrix. Different compounds are determined by properties such as the number of cycles, the kinetics, spectral properties, and the color they exhibit among others. Hence a specific compound can be chosen according to the specific needs of cultivation i.e. lifetime of the plastic film and the respective photochromic system, color needed during the photochromic transition, the kinetics of the process. Furthermore, a combination of compounds could be employed according to the needs of the cultivation for which the final product is tailored.

The materialization of the invention would require an inexpensive matrix that is commonly used for greenhouse or low tunnel films such as Polyolefins (LDPE, MDPE, LLDPE, mLLDPE, VLDPE, PP, EVA, EBA) or similar and it could be achieved in several ways some of which are:
a) The incorporation of the photochromic compound in a layer only or a number of layers in case of a multilayered film.
b) Welding of a stripe or stripes of a previously produced film with photochromic properties on specific areas of the film as this inventor has applied with GR2002100249 (A) and GR 1004441 (B)
c) Lamination of a stripe or stripes of a previously produced film with photochromic properties The preferred methods of producing said films would be a blown-film or a cast film process. The incorporation of the compound could be achieved either in solid state as a masterbatch or as a liquid solution via a common extrusion process.

The photochromic compounds are susceptible to degradation initiated by oxygen so that a barrier film would have to be produced. Excellent barrier properties to gases and especially oxygen are provided by EVOH, PA and PVDC among others. The first two materials exhibit different barrier behavior depending on the levels of relative humidity. The more humid the space where they are employed the higher the permeability. Since Greenhouses are very humid spaces where plants grow PVDC would be the preferred material of choice such as the commercially available SARAN grades by Dow Chemicals.

The films need to be sealable as well on their skin layers hence a Polyolefin such as LDPE, LLDPE, EVA or a blend thereof would be used for their skin layers. The preferred layer composition hence would be a seven-layer film (FIG. 3) and in particular a film that has a core layer (D) comprising EVA as the matrix where the photochromic compound is dispersed. The two next layers (C&E) encapsulating (top and bottom) the core layer would be PVDC (FIG. 3). The layers (B&F) on both PVDC layers would be tie layers made of EVA, bearing high VA content or indeed any other tie layer material that would provide a good interface to the skin layers (A&G) that comprise the polyolefins.

All layers could bear secondary materials in their matrices that provide some additional attributes to the film such as UV radiation stabilizers or antioxidants or even colorants.

A film bearing more than 7 layers could be employed. For example, a nine (9) layer film structure could bear two distinct photochromic compounds or an eleven-layer (11) film could bear 3 distinct photochromic layers.

The invention is described in detail below in conjunction with the accompanying figures.

BRIEF DESCRIPTION OF THE DRAWINGS

FIG. 2: shows a core layer that incorporates a photochromic compound in its matrix (spiro-oxazine in this case) and an enlarged detail of the core layer.

DETAILED DESCRIPTION OF THE INVENTION

Figure 1A:
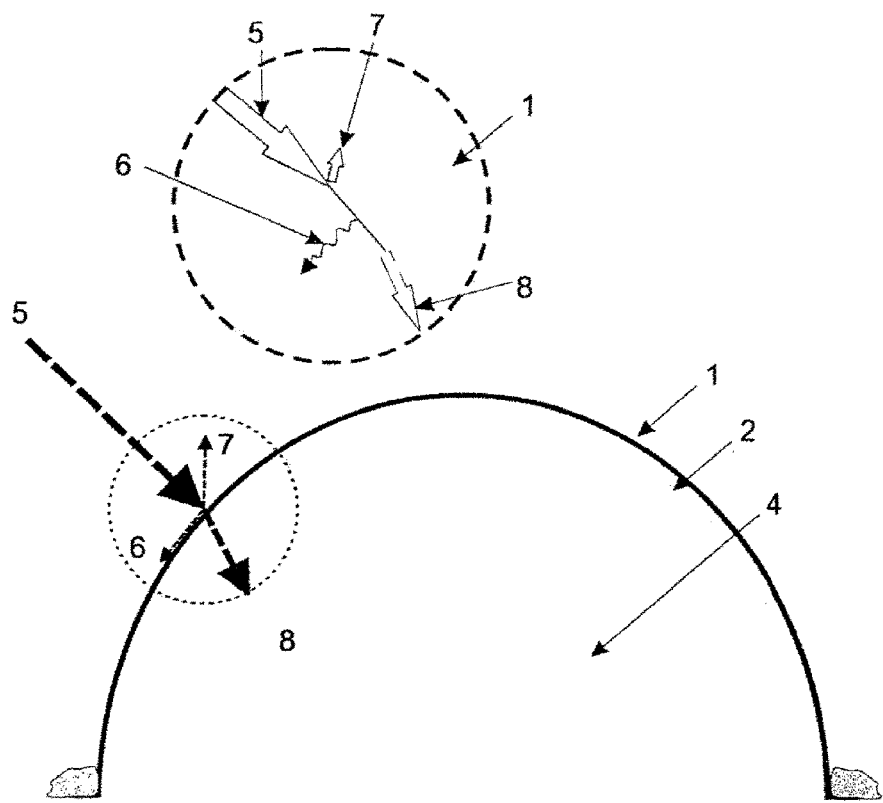
FIG. 1A: shows a photochromic plastic film in a greenhouse or low tunnel that is permeable to sunlight due to low light intensity and an enlarged detail showing the functionality of the film.
Figure 1B:
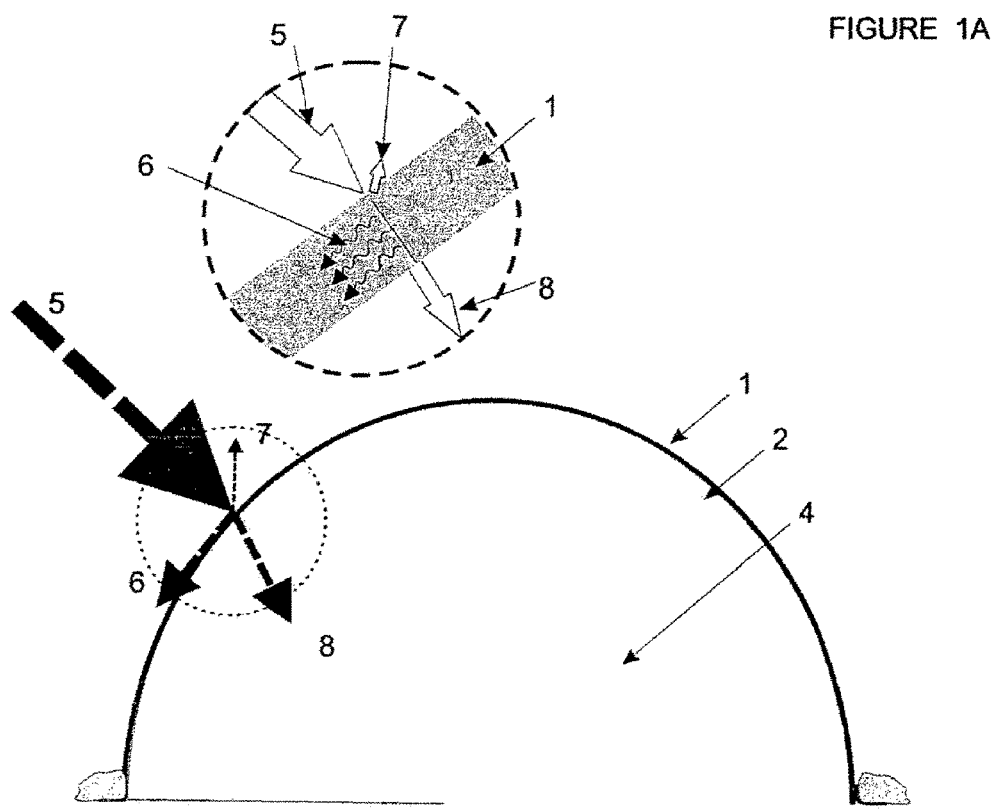
FIG. 1B: shows a photochromic plastic film in a greenhouse or low tunnel that exhibits drastically reduced permeable to sunlight and the shading functionality of the covered space and an enlarged detail of it.
Figure 3:
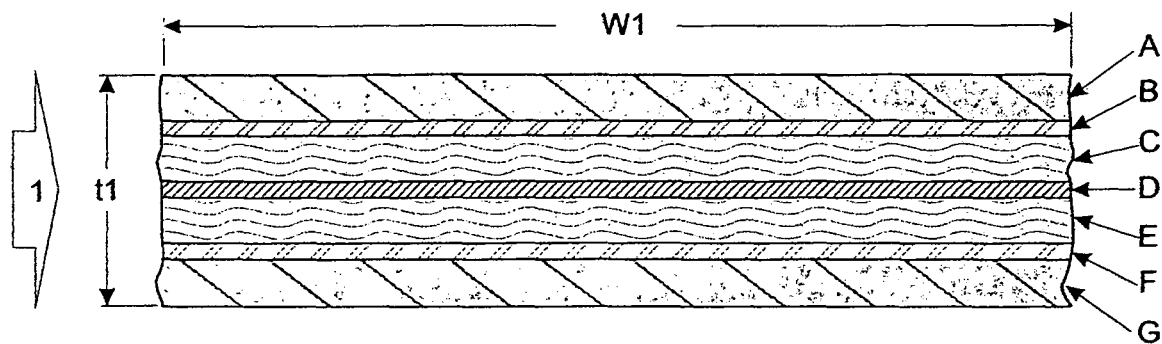
FIG. 3: shows a seven-layer film structure (in cross section) incorporating a photochromic compound in the core layer, encapsulated by barrier layers (PVDC preferably), two Tie Layers that interface the structure to the skin layers and that incorporate Polyolefins.

Several embodiments of the invention are described below:

The plastic film produced by the method of co-extrusion from a circular or flat die or mold having width ($W_1$) and thickness ($t_1$) and preferably having a seven-layer structure (FIG. 3). The photochromic compound is inserted into the extruder either as a master batch or in liquid form using an accurate dosi-metric unit and preferably in the core layer (D). The main material of the core layer (D) could be any polyolefin or a blend thereof that exhibits thermal properties such as EVA. The layers (C&E) encapsulate the layer (D) that incorporates the photochromic compound would exhibit low oxygen permeability and would preferably be PVDC. To interface the layers (C&E) with the skin layers (A&G) that comprise polyolefins, such as LDPE, LLDPE, EVA or a blend thereof, tie layers (B&F) are placed in between. Hence a multilayer structure of the plastic film is formed comprising:

Layer A: Polyolefin such as LDPE, LLDPE, EVA or a blend thereof
Layer B: Tie material compatible with both polyolefins and the barrier material
Layer C: Low oxygen permeability (barrier) material (preferably PVDC)
Layer D: Core Layer that incorporates the photochromic material and has as a matrix a material that exhibits thermal properties such as EVA, preferably with high VA content so that it can be readily interfaced with the barrier layer (preferably PVDC)
Layer E: Low oxygen permeability (barrier) material (preferably PVDC)
Layer F: Tie material compatible with both polyolefins and the barrier material
Layer G: Polyolefin such as LDPE, LLDPE, EVA or a blend thereof An alternative to this structure would be to use as a matrix for the core layer EBA or EVA of low VA content, so that two more tie layers will be needed between the EBA or the low VA content EVA and the respective PVDC layers so that the structure (in cross section) would consist of nine layers.

A nine-layer structure of the plastic film could also arise in case of having two layers incorporating the photochromic compounds bilaterally of the core layer that would consist of EVA of any VA content or EBA.

Layer A: Polyolefin such as LDPE, LLDPE, EVA or a blend thereof
Layer B: Tie material compatible with both polyolefins and the barrier material
Layer C: Low oxygen permeability (barrier) material (preferably PVDC)
Layer D: Layer that incorporates the photochromic material and has as a matrix a material that exhibits thermal properties such as EVA, preferably with high VA content so that it can be readily interfaced with the barrier layer (preferably PVDC)
Layer E: Core layer that has as a matrix a material that exhibits preferably thermal properties such as EVA with high VA content or preferably EBA or EVA with low VA content
Layer F: Layer that incorporates the photochromic material and has as a matrix a material that exhibits thermal properties such as EVA, preferably with high VA content so that it can be readily interfaced with the barrier layer (preferably PVDC)
Layer G: Low oxygen permeability (barrier) material (preferably PVDC)
Layer H: Tie material compatible with both polyolefins and the barrier material
Layer J: Polyolefin such as LDPE, LLDPE, EVA or a blend thereof An alternative to this structure would be to use as a matrix for the core layer EBA or EVA of low VA content, so that two more tie layers will be needed between the EBA or the low VA content EVA and the bilaterally respective PVDC layers so that the structure (in cross section) would consist of eleven layers.

It is apparent that in this reasoning there could be a multitude of combinations of layers and multilayered films that could incorporate, in one or several layers, photochromic materials protected by layers than incorporate low oxygen permeation materials and tie layers, preferable of which is the aforementioned seven-layer structure.

Figure 4:
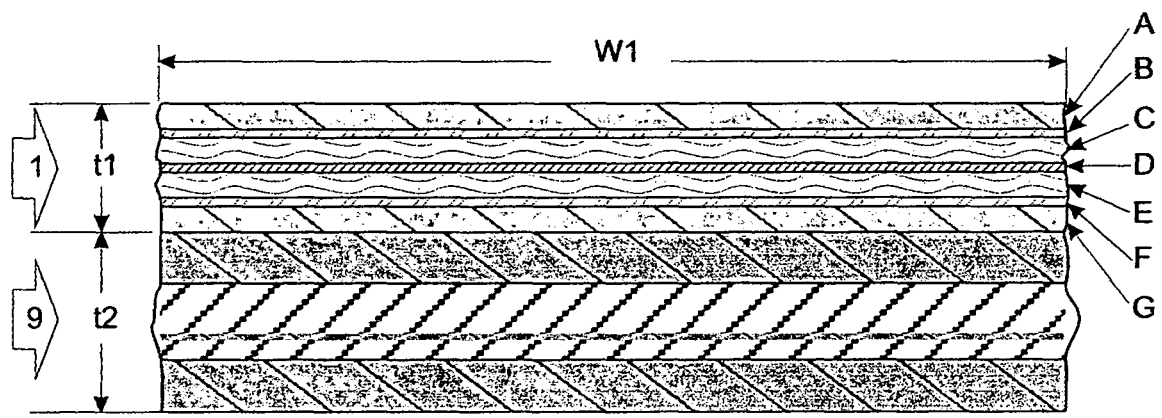
FIG. 4: shows a structure (in cross section) of a plastic film for greenhouses or low tunnel film that comprises a welded or laminated photochromic multilayer film on top of a conventional three-layer film.
Figure 5:
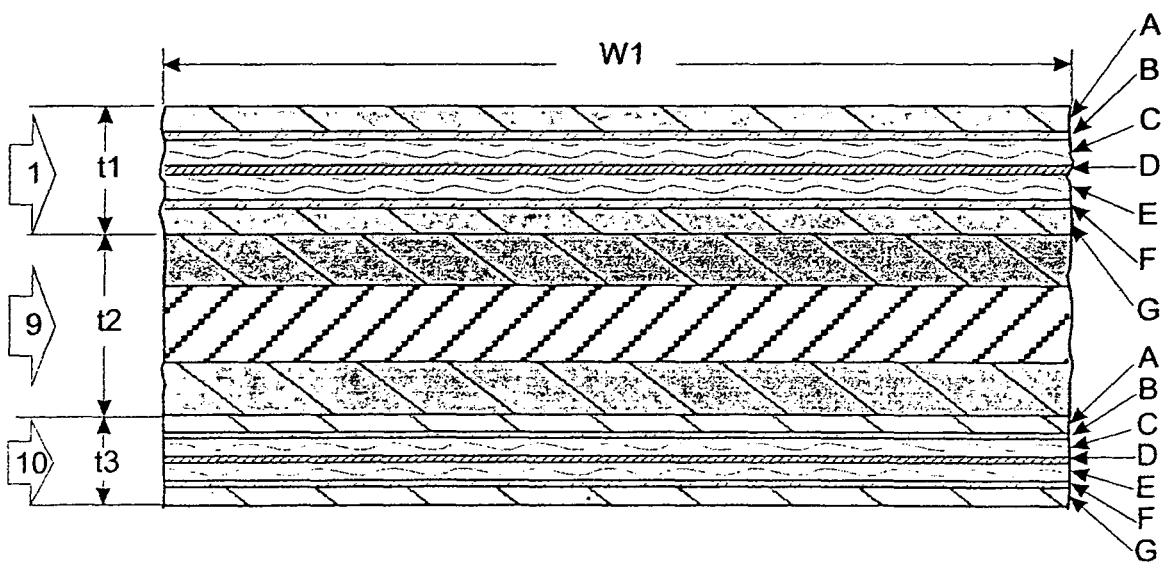
FIG. 5: shows a structure (in cross section) of a plastic film for greenhouses or low tunnel film that comprises two welded or laminated photochromic multilayer film on top of both skin layers of a conventional three-layer film.
Figure 6:
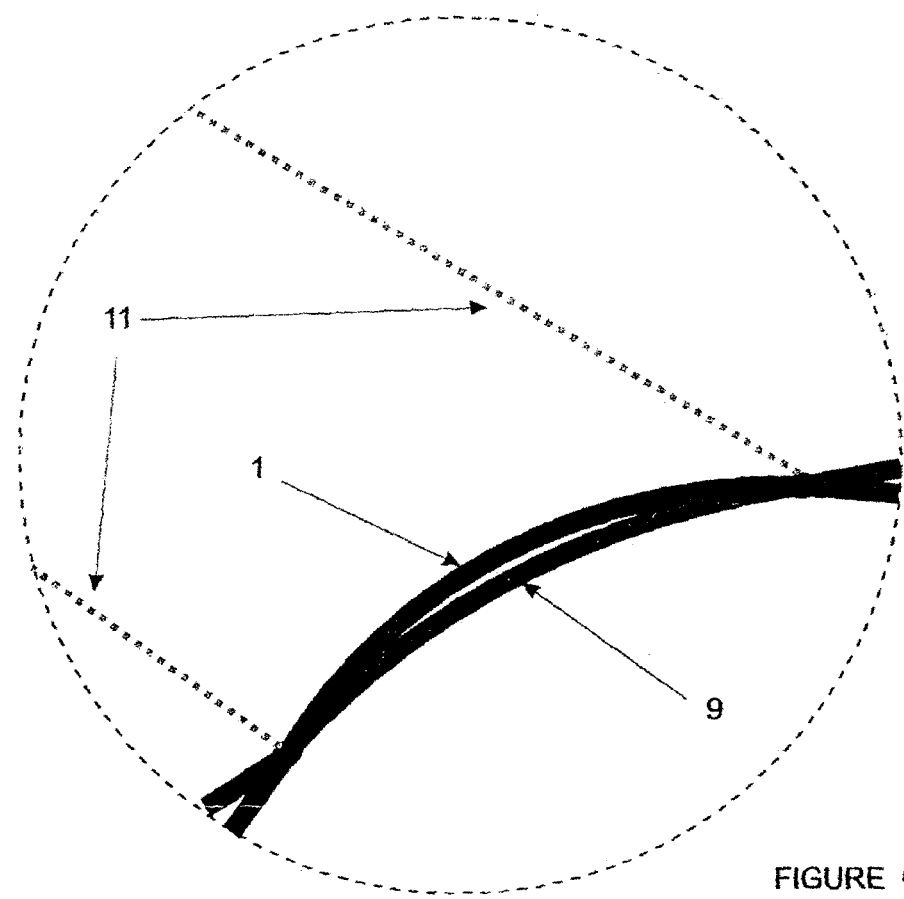
FIGS. 6 & 7: show a photochromic multilayer film welded on top of a conventional greenhouse film with continuous welds and a detail thereof.
Figure 7:
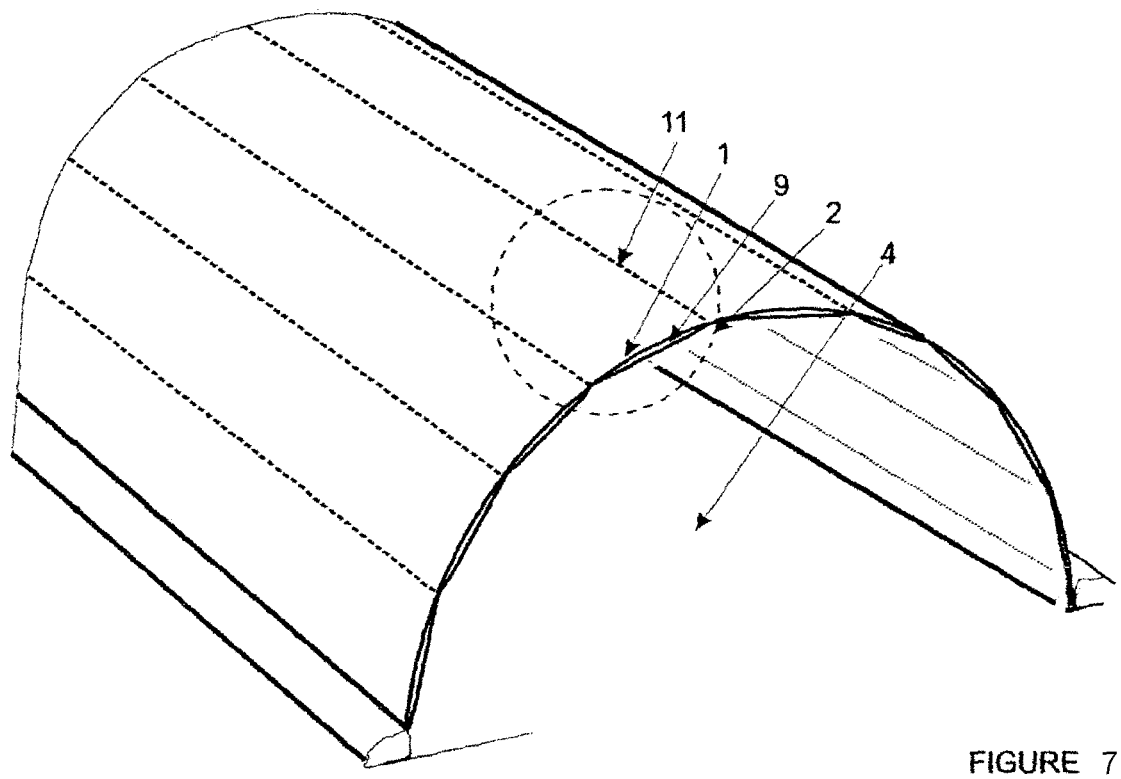
Figure 8:
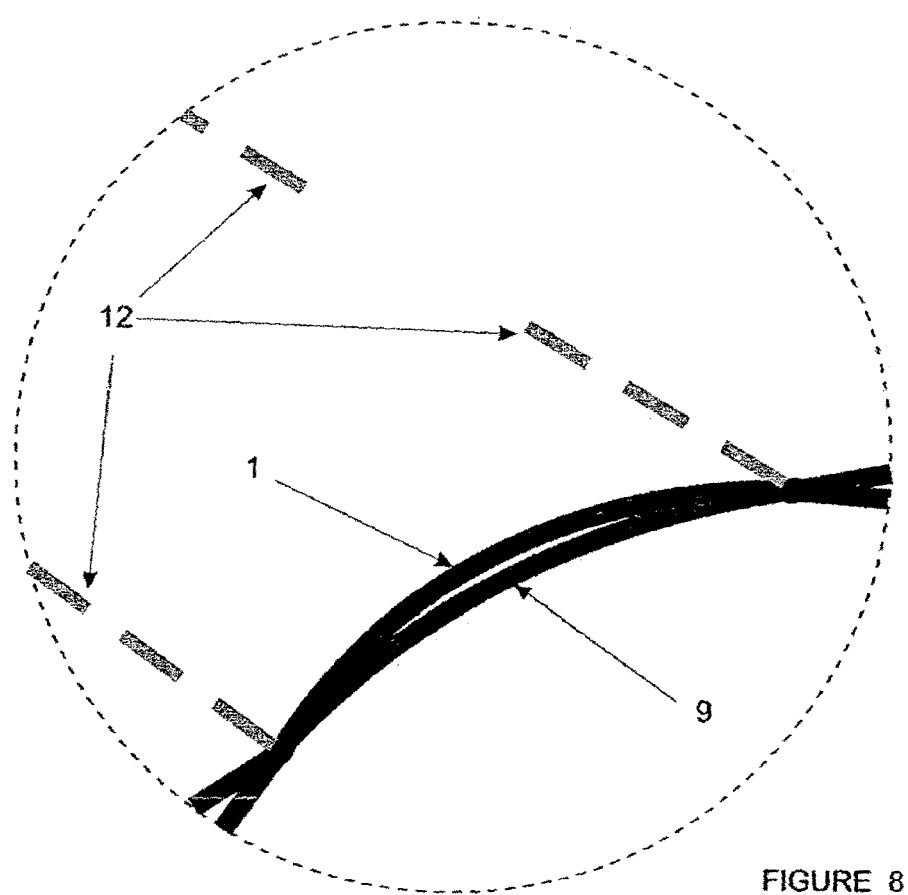
FIGS. 8 & 9: show a photochromic multilayer film welded on top of a conventional greenhouse film with discontinuous welds and a detail thereof.
Figure 9:
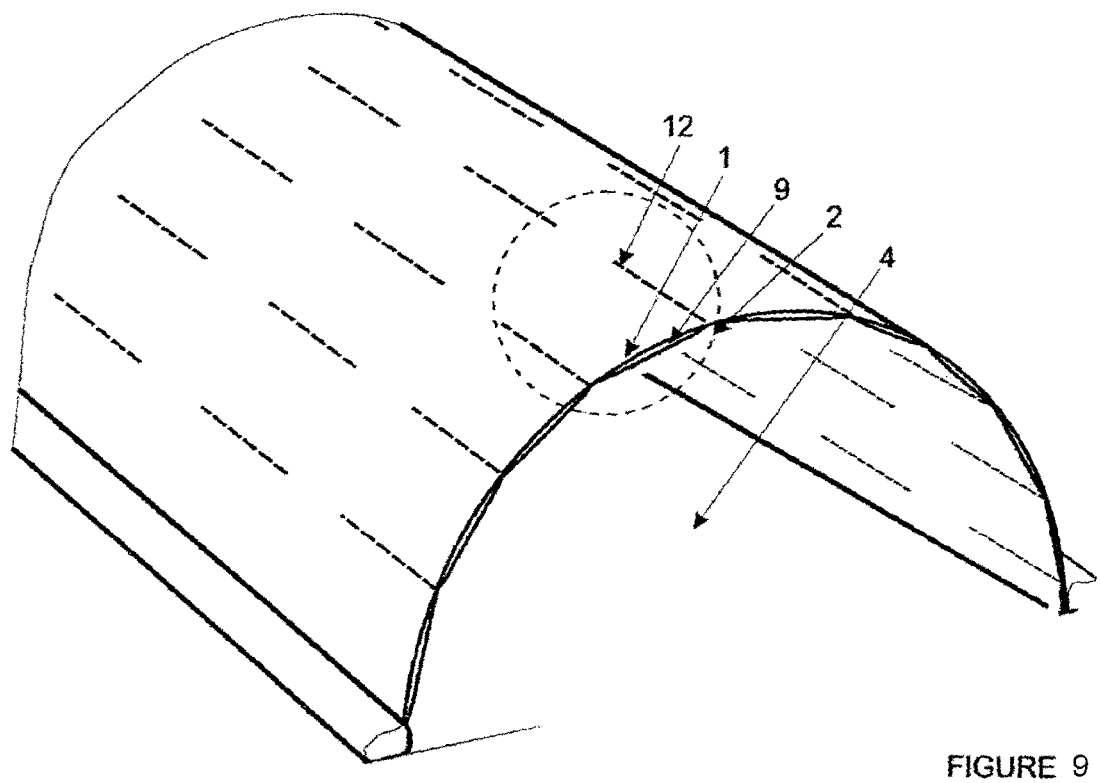

A second embodiment of the invention is by welding a superimposed photochromic film (1) of width ($W_1$) and thickness ($t_1$), on a conventional greenhouse or low tunnel film (2) of width ($W_2$) and thickness ($t_2$) (FIG. 4), where $W_1<W_2$. The welds can be at the whole width of the films (1 & 9) or at some distinct sections, continuous (11) (FIGS. 6 & 7), or discontinuous (12) (FIGS. 8 & 9), in such a manner that the superimposed photochromic film (1) that incorporates the photochromic materials, is fixed on the conventional plastic film (9). A further step would be to weld a second photochromic plastic film (10) of the same or of different composition, having thickness ($t_3=t_2$ or $t_3 \neq t_2$) on the other side of the conventional greenhouse plastic film (9) or low tunnel (FIG. 5) so that a combination of photochromic result is achieved (for example in the visible and infrared spectra).

Figure 10A:
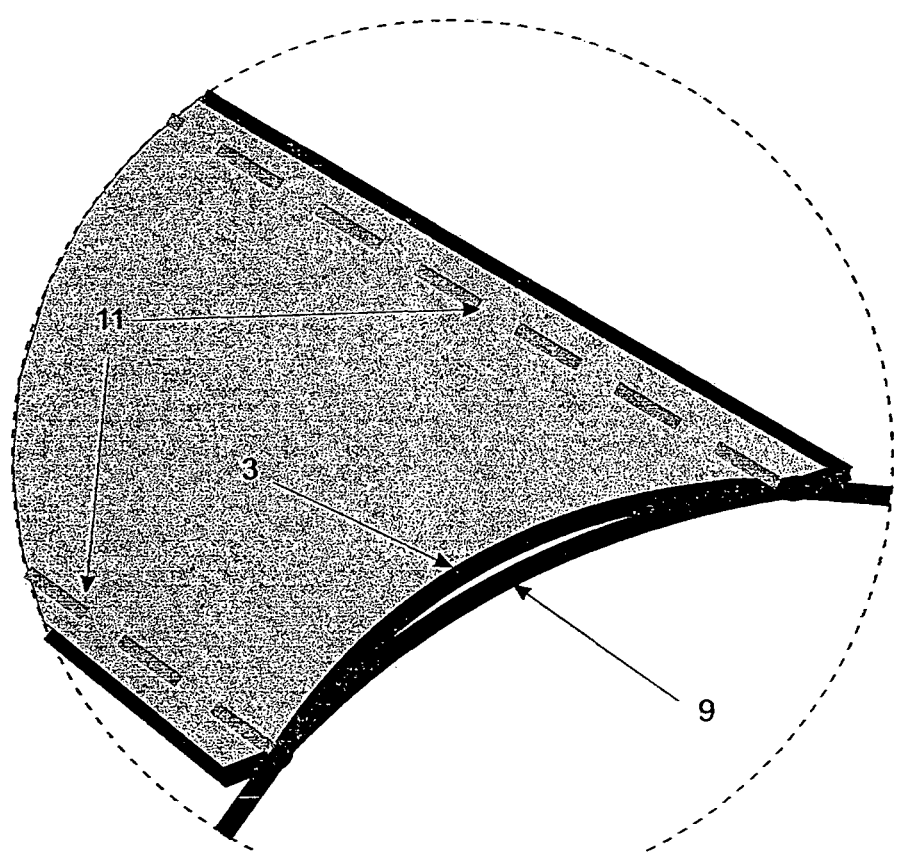
FIGS. 10A & 10B: show strips of a photochromic multilayer film welded on a conventional plastic greenhouse film with continuous or discontinuous welds.
Figure 10B:
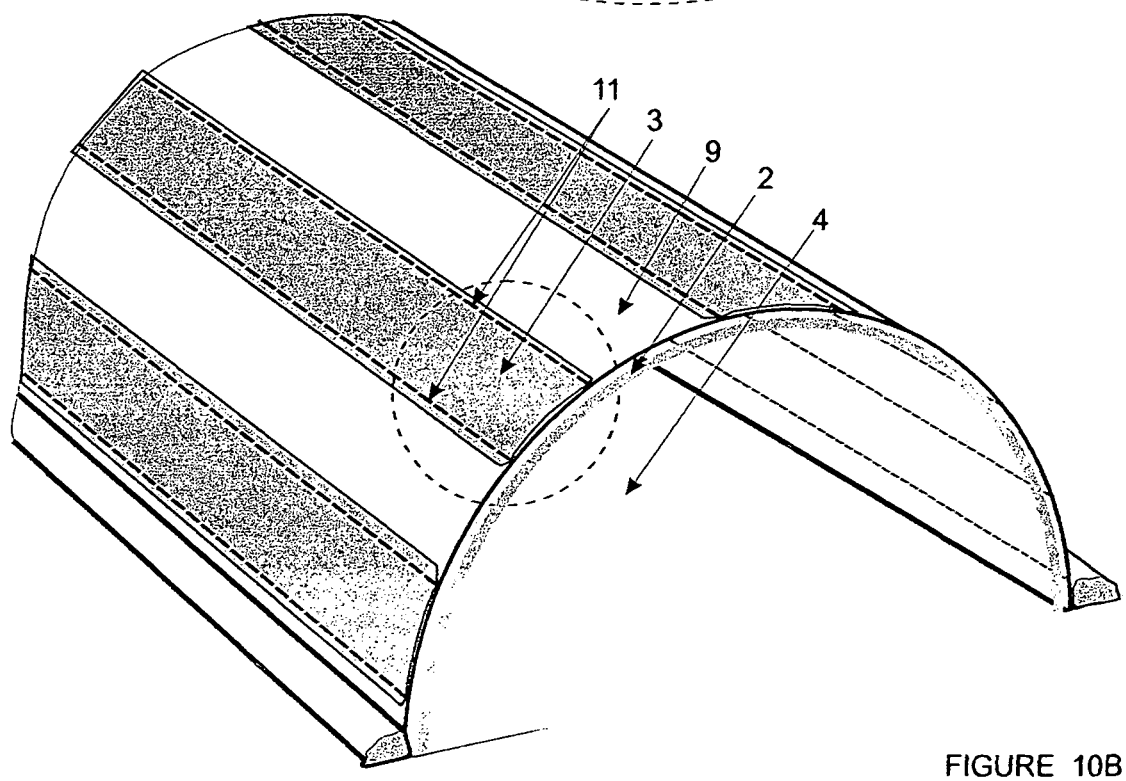

In case that partial shading is needed, a photochromic plastic film of thickness ($t_2$) could be welded in repetitive stripes (3) along the length of the film (FIGS. 10A & 10B). It is of paramount importance to note that the photochromic compound could also have a colored effect that could be employed to provide a shade of a specific coloration in the tunnel.

For the end user the plastic film with self-adjusting shading attribute leads to the next generation of greenhouse films that ensure optimization of the light conditions in the greenhouse or low tunnel and most importantly the self-adjusting of the light conditions according to the ambient light conditions in order to maximize both yield and quality of the crop.

What is claimed is:

1. A multilayer plastic film for perennial agricultural uses, the film having a self-adjusting shading attribute, width ($W_1$), a thickness ($t_1$), and an ability to self-adjust the shading of the space it covers according to existing ambient light conditions, comprising:
    a photochromic compound that is incorporated into a matrix, the multilayered plastic film of said film and encapsulating layers, the encapsulating layers being formed of an oxygen barrier material that has oxygen barrier properties and that encapsulate and protect the photochromic compound from exposure to atmospheric oxygen,
    wherein the film is a coextruded seven-layer film which, in cross section and in sequence, is formed of the following layers:
Layer A: a polyolefin from the group consisting of LDPE (low density polyethylene), LLDPE (Linear Low Density Polyethylene), EVA (ethylene vinyl acetate) and a blend thereof,
Layer B: a tie material compatible with both polyolefins and the oxygen barrier material,
Layer C: a low oxygen permeability (barrier) material,
Layer D: the core layer that incorporates the photochromic compound and has as a matrix a material that exhibits thermal properties,
Layer E: a low oxygen permeability (barrier) material,
Layer F: a tie material compatible with both polyolefins and the oxygen barrier material, and
Layer G: a polyolefin from the group consisting of LDPE, LLDPE, EVA and a blend thereof.

2. The multilayer plastic film for perennial agricultural uses with the self-adjusting shading attribute according to claim 1, wherein the photochromic compound is of width ($W_1$) and thickness ($t_1$) and is superimposed and continuously welded on a multilayer greenhouse or low tunnel film of width ($W_2$) and thickness ($t_2$) where $W_1<W_2$.

3. The multilayer plastic film for perennial agricultural uses with the self-adjusting shading attribute according to claim 1, further comprising two films which incorporate the photochromic compound and are of a first of the two films has width ($W_1$) and a thickness ($t_1$) and a second of the two films has a width ($W_3$) and a thickness ($t_3$), respectively and the two films being superimposed and welded with continuous welds on at least one surface of a multilayer greenhouse or low tunnel film ($W_2$) and thickness ($t_2$) where $W_1<W_2$ and $W_3<W_2$.

4. The multilayer plastic film for perennial agricultural uses with the self-adjusting shading attribute according to claim 1, wherein one or several of the plastic photochromic films is in the form of strips that are welded along the length of the film on at least one surface of a photochromic multilayered greenhouse or low tunnel film.

5. The multilayer plastic film for perennial agricultural uses with the self-adjusting shading attribute according to claim 1, wherein the produced shading is of any coloration of the visible electromagnetic spectrum or the non-visible electromagnetic spectrum.

6. The multilayer plastic film for perennial agricultural uses with the self-adjusting shading attribute according to claim 1, wherein at least one of said layers has at least one of antioxidants and UV radiation stabilizers-absorbers.

7. The multilayer plastic film for perennial agricultural uses with the self-adjusting shading attribute according to claim 1, wherein two films incorporate the photochromic compound, and a first of the two films having a width ($W_1$) and a thickness ($t_1$) and a second of the two films having a width ($W_3$) and thickness ($t_1$) respectively and are superimposed and welded with discontinuous welds on at least one surface of a multilayer greenhouse or low tunnel film of width ($W_2$) and thickness ($t_1$) where $W_1<W_2$ and $W_3<W_2$ and $t_2>t_1$ and $t_2>t_3$.

8. The multilayer plastic film for perennial agricultural uses with the self-adjusting shading attribute according to claim 1, wherein said matrix is formed of a core layer of the multilayer plastic film.

9. The multilayer plastic film for perennial agricultural uses with the self-adjusting shading attribute according to claim 1, wherein said matrix is formed of multiple layers of the multilayer plastic film.

10. A multilayer plastic film for perennial agricultural uses, the film having a self-adjusting shading attribute, a width ($W_1$), a thickness ($t_1$), and having an ability to self-adjust shading of a space covered thereby according to existing ambient light conditions, comprising:

a photochromic compound that is incorporated into a matrix, the matrix being comprised of at least a core layer and encapsulating layers, the encapsulating layers being formed of layers of a material having oxygen barrier properties and that encapsulates and protects the photochromic compound so that the photochromic compound is protected from exposure to atmospheric oxygen, wherein the film is a coextruded nine-layer film which, in cross section and in sequence, is formed of the following layers:
Layer A: a polyolefin from the group consisting of LDPE (low density polyethylene),
LLDPE (Linear Low Density Polyethylene), EVA (ethylene vinyl acetate) and a blend thereof,
Layer B: a tie material compatible with both polyolefins and the oxygen barrier material,
Layer C: a low oxygen permeability (barrier) material,
Layer D: a tie material compatible with both polyolefins and the oxygen barrier material,
Layer E: the core layer that incorporates the photochromic material and has a matrix material that exhibits thermal properties,
Layer F: a tie material compatible with both polyolefins and the oxygen barrier material,
Layer G: a low oxygen permeability (barrier) material,
Layer H: a tie material compatible with both polyolefins and the oxygen barrier material, and
Layer J: a polyolefin from the group consisting of LDPE, LLDPE, EVA and a blend thereof.

11. The multilayer plastic film for perennial agricultural uses with the self-adjusting shading attribute according to claim 10, wherein the photochromic compound has a width ($W_1$), a thickness ($t_1$) and is superimposed and continuously welded on a multilayer greenhouse or low tunnel film of width ($W_2$) and thickness ($t_2$), where $W_1<W_2$.

12. The multilayer plastic film for perennial agricultural uses with the self-adjusting shading attribute according to claim 10, further comprising two films which incorporate the photochromic compound, wherein a first of the two films has a width ($W_1$) and a thickness ($t_1$) and a second of the two films has a width ($W_3$) and a thickness ($t_3$), the two films being superimposed and welded with continuous welds on both surfaces of a conventional multilayer greenhouse or low tunnel film of width ($W_2$) and thickness ($t_2$) where $W_1<W_2$ and $W_3<W_2$, and $t_2>t_1$ and $t_2>t_3$.

13. The multilayer plastic film for perennial agricultural uses with the self-adjusting shading attribute according to claim 10, wherein the plastic photochromic film is in the form of strips welded along the length of the film on at least one surface of a photochromic multilayered greenhouse or low tunnel film.

14. The multilayer plastic film for perennial agricultural uses with the self-adjusting shading attribute according to claim 10, wherein the produced shading is of any coloration of the visible electromagnetic spectrum or the non-visible electromagnetic spectrum.

15. The multilayer plastic film for perennial agricultural uses with the self-adjusting shading attribute according to claim 10, wherein at least one of said layers has at least one of antioxidants and UV radiation stabilizers-absorbers.

16. The multilayer plastic film for perennial agricultural uses with the self-adjusting shading attribute according to claim 10, wherein two films incorporate the photochromic compound, and a first of the two films having a width ($W_1$) and a thickness ($t_1$) and a second of the two films having a width ($W_3$) and thickness ($t_1$) respectively and are superimposed and welded with discontinuous welds on at least one surface of a multilayer greenhouse or low tunnel film of width ($W_2$) and thickness ($t_1$) where $W_1<W_2$ and $W_3<W_2$ and $t_2>t_1$ and $t_2>t_3$.

17. The multilayer plastic film for perennial agricultural uses with the self-adjusting shading attribute according to claim 10, wherein said matrix is formed of a core layer of the multilayer plastic film.

18. The multilayer plastic film for perennial agricultural uses with the self-adjusting shading attribute according to claim 10, wherein said matrix is formed of multiple layers of the multilayer plastic film.

19. A multilayer plastic film for perennial agricultural uses with the self-adjusting shading attribute, the film having a width ($W_1$), and of a thickness ($t_1$), and a self-adjust shading attribute having an ability to self-adjust shading of a space covered thereby according to existing ambient light conditions, comprising:
  a photochromic compound that is incorporated into a matrix of the multilayered plastic film and which is encapsulated by layers, the encapsulating layers being formed of an oxygen barrier material having oxygen barrier properties and that encapsulates and protects the photochromic compound the photochromic compound so that the photochromic compound is protected from exposure to atmospheric oxygen,
  wherein the film is a coextruded nine-layer film which, in cross section and in sequence, is formed of the following layers:
Layer A: a polyolefin from the group consisting of LDPE (low density polyethylene),
LLDPE (Linear Low Density Polyethylene), EVA (ethylene vinyl acetate) and a blend thereof,
Layer B: a tie material compatible with both polyolefins and the oxygen barrier material,
Layer C: a low oxygen permeability (barrier) material,
Layer D: a layer that incorporates the photochromic material and has as a matrix a material that exhibits thermal properties,
Layer E: the core layer and a matrix a material that exhibits thermal properties,
Layer F: a layer that incorporates the photochromic material and has as a matrix a material that exhibits thermal properties
Layer G: a low oxygen permeability (barrier) material,
Layer H: a tie material compatible with both polyolefins and the oxygen barrier material, and
Layer J: a polyolefin from the group consisting of LDPE, LLDPE, EVA and a blend thereof.

20. The multilayer plastic film for perennial agricultural uses with the self-adjusting shading attribute according to claim 19, the photochromic compound is of a width ($W_1$) and a thickness ($t_1$) and is superimposed and welded on a multilayer greenhouse or low tunnel film of width ($W_2$) and thickness ($t_2$) where $W_1<W_2$, and $t_2>t_1$.

21. The multilayer plastic film for perennial agricultural uses with the self-adjusting shading attribute according to claim 19, further comprising two films which incorporate the photochromic compound, wherein a first of the two films has width ($W_1$) and a thickness ($t_1$) and a second of the two films has a width ($W_3$) and a thickness ($t_3$), the two films being superimposed and welded with continuous welds on both surfaces of a multilayer greenhouse or low tunnel film of width ($W_2$) and thickness ($t_2$) where $W_1<W_2$ and $W_3<W_2$, and $t_2>t_1$ and $t_2>t_3$.

22. The multilayer plastic film for perennial agricultural uses with the self-adjusting shading attribute according to claim 19, wherein one or several of the plastic photochromic films in the form of strips welded along the length of the film on at least one surface of a or photochromic multilayered greenhouse or low tunnel film.

23. The multilayer plastic film for perennial agricultural uses with the self-adjusting shading attribute according to claim 19, wherein the produced shading is of any coloration of the visible electromagnetic spectrum or the non-visible electromagnetic spectrum.

24. The multilayer plastic film for perennial agricultural uses with the self-adjusting shading attribute according to claim 19, wherein at least one of said layers has at least one of antioxidants and UV radiation stabilizers-absorbers.

25. The multilayer plastic film for perennial agricultural uses with the self-adjusting shading attribute according to claim 19, the photochromic compound is of width ($W_1$) and thickness ($t_1$) and is superimposed and welded with discontinuous welds on a multilayer greenhouse or low tunnel film of width ($W_2$) and thickness ($t_2$) where $W_1<W_2$ and $t_2>t_1$.

26. The multilayer plastic film for perennial agricultural uses with the self-adjusting shading attribute according to claim 19, wherein two films incorporate the photochromic compound and are of width ($W_1$) and thickness ($t_1$) and ($W_3$) and thickness ($t_3$) respectively and are superimposed and welded with discontinuous welds on both surfaces of a monolayer or multilayer greenhouse or low tunnel film of width ($W_2$) and thickness ($t_2$) where $W_1<W_2$ and $W_3<W_2$, and $t_2>t_1$ and $t_2>t_3$.

27. The multilayer plastic film for perennial agricultural uses with the self-adjusting shading attribute according to claim 19, wherein said matrix is formed of a core layer of the multilayer plastic film.

28. The multilayer plastic film for perennial agricultural uses with self-adjusting the shading attribute according to claim 19, wherein said matrix is formed of multiple layers of the multilayer plastic film.

* * * * *